O. FOX.
GAS SHUT-OFF VALVE.
APPLICATION FILED SEPT. 17, 1915.
1,233,659.
Patented July 17, 1917.
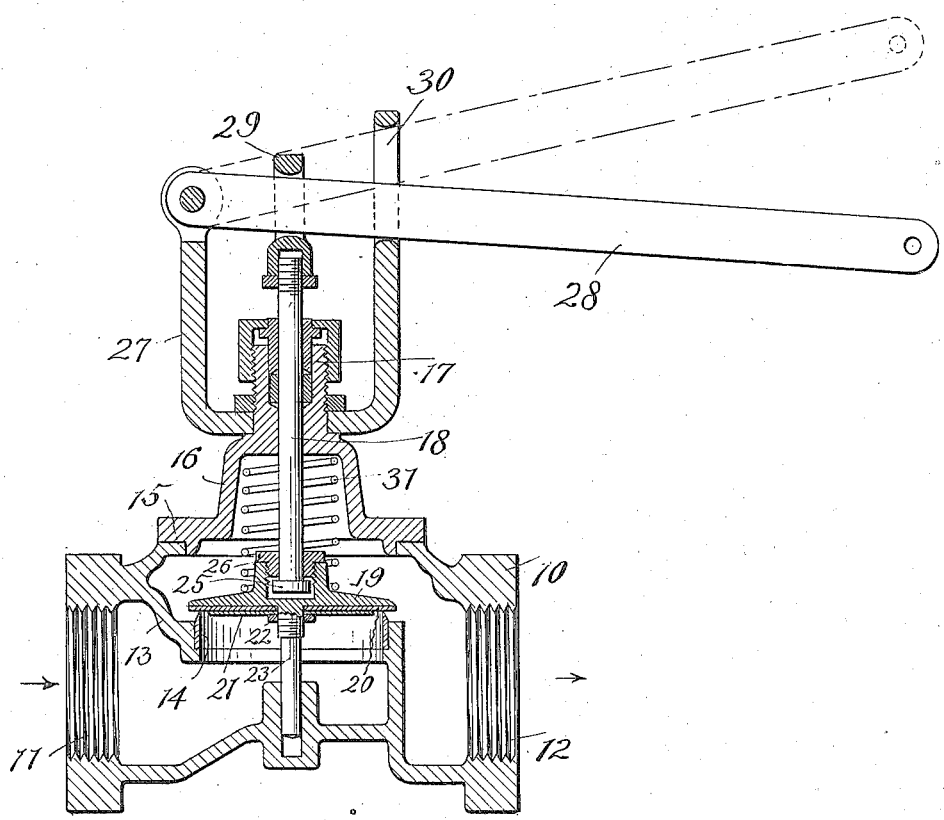
Inventor:
Otto Fox
by Thurston & Kwis
Attys.

UNITED STATES PATENT OFFICE.

OTTO FOX, OF LAKEWOOD, OHIO, ASSIGNOR TO THE BRYANT HEATER & MANUFACTURING CO., OF CLEVELAND, OHIO, A CORPORATION OF OHIO.

GAS-SHUT-OFF VALVE.

1,233,659.  Specification of Letters Patent.  Patented July 17, 1917.

Application filed September 17, 1915. Serial No. 51,138.

*To all whom it may concern:*

Be it known that I, OTTO FOX, a citizen of the United States, residing at Lakewood, in the county of Cuyahoga and State of Ohio, have invented a certain new and useful Improvement in Gas-Shut-Off Valves, of which the following is a full, clear, and exact description.

This invention relates to a valve adapted particularly for use as a gas shut-off valve and has for its chief object to provide a valve which is more serviceable, durable and satisfactory in operation than the valves used for a similar purpose heretofore.

More specifically considered, the invention aims to provide a gas shut-off valve wherein the valve proper has a soft face which engages a sharp seat and to construct and operate the parts in such a way that it is practically impossible for the seat to cut deeply into the valve face or for more than a predetermined pressure to be exerted on the valve to close the same or to press the valve down onto the seat.

A further object is to provide a construction wherein there may be a very large valve opening without requiring excessive pressure to close the valve and without requiring pressure which might injure the soft face of the valve or cause the seat to cut deeply into the same, so that by reason of the large valve opening which is permitted by the construction only a comparatively small valve movement is required to permit a full flow of gas or to shut off the flow entirely.

A still further object is to provide a construction wherein a valve stem and lever connected to it may be employed to open the valve but cannot be employed to directly close the valve, whereby it will be impossible for anyone to grasp the lever and force the valve downward with severe pressure onto its seat as is often done with present constructions when the valve does not seat properly due to the presence of foreign matter between the valve and its seat.

The invention may be briefly summarized as consisting in certain novel details of construction and combinations and arrangements of parts which will be described in the specification and set forth in the appended claims.

In the accompanying sheet of drawings wherein I have shown the preferred embodiment of my invention the single figure is a sectional view through a valve constructed in accordance with my invention.

The valve includes a valve body or casing 10 having at one end a threaded opening 11 for an inlet pipe and at the opposite end a threaded opening 12 for an outlet pipe. Additionally, the valve body is provided between the inlet and outlet openings with a partition 13 dividing the body into inlet and outlet compartments or chambers, the said partition having a circular opening in which is tightly fitted a circular valve seat 14 with a sharp upper edge.

Above the partition 13 there is a cap 15 having an upper dome-shaped portion 16 at the top of which is a neck or stuffing box 17 through which passes a valve stem 18. At its lower end the stem is connected to a disk-like valve 19 having a flat lower side with a face or facing 20 of leather or other soft material which is adapted to engage or to seat upon the upper sharp edge of the valve seat 14. This face or facing 20 may be held in position against the valve 19 by a metal disk 21 held in position by a nut 22 which in this case is screwed onto a threaded part of a guide stem 23, the lower end of which has a loose sliding fit in an opening formed in an enlarged part of the valve body.

The valve stem 18 does not have a direct or tight connection with the valve, but is loosely connected thereto in such a manner that between the valve and the stem there may be a certain amount of lost motion or play. In this instance this is brought about by providing on the lower end of the valve stem 18 a shoulder 25 having a predetermined amount of play between the lower part of the valve and a nut 26 which is screwed into an upper extension of the valve and through which the stem loosely passes.

Seated on the upper part of the dome 16 of cap 15 is a yoke 27 having two upstanding arms on opposite sides of the stem. To the upper end of one of these arms is pivoted a lever 28 which is employed to open the valve and to the outer end of which may be connected any suitable automatic or manual valve-controlling device, such for example as a thermostatically controlled diaphragm. As the present invention resides solely in the valve and as the means for opening the valve forms no part of the invention said means is not herein disclosed. The lever 28 passes through an elongated opening in a member 29 which is screwed onto the upper end of the valve stem and it also passes through a slot 30 in the other arm of the yoke 27. As before stated, this lever 28 is employed to open the valve and is not directly available for closing the valve, but when the lever is lowered from its uppermost position the valve is closed by a spring 31 which in this case is in the form of a coil spring surrounding the stem and at one end bearing against the upper part of the cap and at its lower end bearing against the top of the valve.

To open the valve the lever is raised, it being possible to raise the lever until it reaches the upper end of the slot 30 in the yoke 27. When the lever 28 is lowered the valve is closed but it is closed and held down onto the seat solely by the spring 31, because before the valve is seated the lever 28 engages the stop or shoulder formed at the lower end of the opening 30. As shown in the drawing, the lever is in its lowermost position but the shoulder 25 at the lower end of the valve stem 18 is about midway between the bottom of the nut 26 and the portion of the valve beneath the shoulder. By reason of this feature, i. e., the loose connection between the valve stem and valve, it is impossible to press the valve down onto the seat by the lever. It is, therefore, possible to use the soft valve face and the sharp seat without danger of the seat cutting into the valve face and thus destroying it. With prior gas shut-off valves wherein the lever has a direct connection with the valve, when the valve does not seat properly due to foreign matter between the valve and the seat it is rather common practice to push the lever down with great pressure or to hammer the valve onto its seat, and this, of course, tends to destroy the usefulness of the valve or to shorten its life. This practice is, however, impossible with the construction above described and in consequence the valve can be used with full efficiency for a long period of time. Furthermore, in view of the fact that the valve cannot be forced down against the seat with more than a predetermined pressure I can use an unusually soft valve face into which the seat embeds itself very readily so that not only am I enabled to employ a fairly weak spring to close the valve but at the same time I can use an unusually large valve opening and valve proper, and these combined features render the valve sensitive, i. e., only a slight movement is required to close or open the valve to permit a substantially full flow of gas or to shut off the flow entirely.

While I have shown only the preferred construction, it is to be understood of course that certain changes may be made without departing from the spirit and scope of my invention. For example, the construction may be varied by placing the sharp edge on the valve and the soft face on the seat, i. e., by simply reversing the positions of the sharp edge and the soft face. This reversed arrangement, however, is more expensive than the arrangement shown and is less satisfactory in use.

Having thus described my invention, what I claim is:—

1. In a valve, a valve body having inlet and outlet passageways and a partition between the same, a valve seat carried by the partition, a valve seated on the seat and adapted to move upwardly therefrom, the seat and valve having one a sharp edge and the other a soft non-metallic facing into which the edge is adapted to be embedded, a spring engaging the valve and normally pressing the same downwardly on the seat, a valve stem for opening the valve and having a lost motion connection therewith said lost motion connection preventing the seating of the valve by pressure applied through the stem whereby the valve will be seated and the sharp edge will be embedded in the non-metallic facing solely by the pressure provided by the spring.

2. In a valve, a valve body having inlet and outlet passageways and a partition between the passageways, a valve seat carried by the partition, a valve adapted to be seated on the seat, said valve and seat one having a soft facing and the other a hard sharp edge adapted to be embedded in the facing, said valve body having an extension at the top thereof, a spring between the extension and the valve, a valve stem guided for movement in said extension and extending downwardly to the valve the top of the valve having an enlargement with which the lower end of the stem has a lost motion connection, and means limiting the movement of the stem relative to the valve whereby the valve will be seated solely by the pressure created on the valve by the spring.

3. In a valve, a valve body having inlet and outlet openings and a partition between the same, a circular valve seat provided with a sharp upstanding edge carried by said partition, a valve above said seat and provided with a soft facing in which the seat is adapted to be embedded, an extension of the valve body arranged above the seat and valve, a spring between said extension and the valve and serving to normally seat the valve, a stem guided in said extension and at its lower end having a lost motion connection with the valve, a valve operating lever pivotally supported on said valve body extension the lever having a connection with the stem by which the stem may be raised and lowered, and means forming stops for limiting the movement of the lever in both directions the stop limiting the downward movement of the lever preventing pressure being applied through the stem to seat the valve whereby the valve is seated solely by the spring.

In testimony whereof, I hereunto affix my signature.

OTTO FOX.